US006023944A

United States Patent [19]
Blundell

[11] Patent Number: 6,023,944
[45] Date of Patent: Feb. 15, 2000

[54] APPARATUS AND METHOD FOR PROCESSING A SUBLIMED MATERIAL

[75] Inventor: Neil Blundell, Risley, United Kingdom

[73] Assignee: British Nuclear Fuels, PLC, United Kingdom

[21] Appl. No.: 09/147,776

[22] PCT Filed: Aug. 14, 1997

[86] PCT No.: PCT/GB97/02181

§ 371 Date: Feb. 26, 1999

§ 102(e) Date: Feb. 26, 1999

[87] PCT Pub. No.: WO98/08994

PCT Pub. Date: Mar. 5, 1998

[30] Foreign Application Priority Data

Aug. 30, 1996 [GB] United Kingdom .................. 9618188

[51] Int. Cl.[7] .................................................. F25J 3/00
[52] U.S. Cl. .................................................. 62/637
[58] Field of Search .................................................. 62/637

[56] References Cited

U.S. PATENT DOCUMENTS

| | | | |
|---|---|---|---|
| 4,181,508 | 1/1980 | Schmid et al. | 62/637 |
| 4,281,518 | 8/1981 | Muller et al. | 62/637 |
| 4,546,611 | 10/1985 | Eby et al. . | |
| 4,773,923 | 9/1988 | Scharf | 62/637 |
| 4,867,763 | 9/1989 | Scharf | 62/637 |

FOREIGN PATENT DOCUMENTS 1500150 7/1966 France .

*Primary Examiner*—Ronald Capossela
*Attorney, Agent, or Firm*—Myers Bigel Sibley & Sajovec

[57] ABSTRACT

Apparatus for the solidification by desublimation of a sublimed gaseous substance and the subsequent trapping and liquidation of the desublimed substance is described. The apparatus comprises: means for the supply of a coolant fluid to a process vessel means; means for the supply of the sublimed substance to the vessel; means for enabling the direct contact and mixing of the coolant fluid with the sublimed substance so as to reduce the temperature of the sublimed substance to below a dewpoint thereof; the vessel means including heating means at least about the tank portion; valve means to enable the vessel means to be sealed to allow a raised pressure to be established in the vessel; conduit means having a first end at the position adjacent a lower end of the tank portion such as to be immersed in liquid resulting from the liquefaction of the desublimed substance, and a second end remote from the first end outside the vessel and connected to means to receive the liquefied substance; and the conduit means having means to permit the controlled expulsion of the liquefied substance.

20 Claims, 2 Drawing Sheets

32
28
30
14

26
22
24
10
12
18
20
2
2
36
36
16
18
20
36

APPARATUS AND METHOD FOR PROCESSING A SUBLIMED MATERIAL

The present invention relates to apparatus for processing a sublimed material and particularly, though not exclusively, for desubliming and trapping sublimed uranium hexafluoride ($UF_6$).

Currently, when $UF_6$ is being manufactured or irradiated uranium fuel is being reprocessed, a common step in the processing cycle is to de-sublime $UF_6$ gas from the vapour phase to the solid and then convert to the liquid by heating under increased pressure. The apparatus currently in use employs large heat exchanger vessels having many internal tubes and a cooling jacket through which ethylene glycol coolant, for example, is pumped and around which, by means of many baffles fixed to the tubes, $UF_6$ is forced to take a circuitous route. The $UF_6$ condenses on the outside of the tubes and the process stops when the internal volume of the heat exchanger becomes filled with condensed $UF_6$ and blocks the passage of further $UF_6$ gas. However, owing to the nature of the apparatus and process, the heat exchanger can become blocked to the passage of further $UF_6$ gas long before the total available volume of the heat exchanger is filled with condensed gas leading to inefficiency in the process.

The condensed $UF_6$ gas is then converted to the liquid form by sealing off the heat exchanger by valves, heating the contents using hot heat exchange fluid and allowing the subliming $UF_6$ to create a pressure rise up above 2 Bar within the heat exchanger vessel such that the $UF_6$ liquefies and is finally run off to storage as $UF_6$ product or to the next process step for uranium which is being reprocessed.

A further disadvantage of the present plant is that many welded joints are required to manufacture the heat exchanger, the welds being susceptible to mechanical failure by fatigue from thermal cycling. Weld failure can lead to contamination of the coolant which then requires treatment itself and which is extremely expensive.

A yet further significant disadvantage of the present apparatus is that the glycol heat transfer fluid requires complex and expensive additional plant for its treatment and recirculation.

GB-A-1 381 892 describes a method and apparatus for the desublimation of a sublimable substance. The apparatus and method principally relate to the desublimation of materials which are normally solid at ambient temperatures and pressures and which sublime at relatively higher temperatures. This reference is mainly concerned with preventing the build-up of desublimed vapours onto the internal walls of the desubliming vessel by the provision of a porous inner wall in the vessel through which gas may be passed to prevent deposition of desublimed material thereon.

It is an object of the present invention to provide treatment plant, principally for $UF_6$, which is significantly more economic to operate and manufacture and which does not have the operating blockage problems of known plant as described above. It is a further object of the present invention to provide apparatus, principally for the treatment of $UF_6$, which has fewer welds liable to fatigue than are present in prior art apparatus.

According to a first aspect of the present invention there is provided apparatus for the solidification by desublimation of a sublimed gaseous substance and the subsequent trapping and liquefication of said desublimed substance, the apparatus comprising:

means for the supply of a coolant fluid to a process vessel means;

means for the supply of said sublimed substance to said vessel;

means for enabling the direct contact and mixing of said coolant fluid with said sublimed substance so as to reduce the temperature of said sublimed substance to below a dewpoint thereof;

said vessel means including a lower tank portion into which solid desublimed substance falls;

said vessel means further including heating means at least about said tank portion;

valve means to enable said vessel means to be sealed to allow a raised pressure to be established in said vessel means;

conduit means having a first end at a position adjacent a lower end of said tank portion such as to be immersed in liquid resulting from the liquefaction of said desublimed substance, and a second end remote from said first end outside said vessel and connected to means to receive said liquefied substance; and said conduit means having means to permit the controlled expulsion of said liquefied desublimed substance.

According to a second aspect of the present invention there is provided a method for the solidification by desublimation of a sublimed gaseous substance and the subsequent trapping and liquefaction of said desublimed substance, the method comprising the steps of:

cooling a sublimed substance by direct mixing with a coolant fluid within process vessel means to a temperature below a dewpoint of said sublimed substance to cause desublimation of said sublimed substance into a solid;

allowing said solid to settle and be collected in a collecting tank portion of said process vessel means;

heating said desublimed substance in said vessel means and causing a pressure rise within said vessel, the combined effect of said heating and said pressure rise being to cause liquefaction of said desublimed substance in said process vessel means.

The sublimed gas may be $UF_6$ but may comprise any other suitable gas in the wider chemical field. Examples of such gases may include zirconium tetrafluoride, phosphorus pentoxide, naphthalene and iodine.

This aspect of the present invention is particularly beneficial when applied to the manufacture of a new pure stream of $UF_6$ which has little radioactivity.

On desublimation within the process vessel means, the substance may form particles thereof and fall into the collecting tank portion and produce a gradually rising level thereof without the possibility of forming blockages as in prior art apparatus.

Once the collecting tank portion of the process vessel means contains a desired quantity of solid $UF_6$ particles, the vessel may be sealed off, heated and the resulting pressure rise within the closed vessel causing the solid $UF_6$ to liquefy and which may then be run off into separate storage vessels for future use or further processing as appropriate.

Alternatively, the vessel may be pressurised by admitting a pressurised inert gas which may also be used to drive the liquor out of the vessel.

The coolant fluid may be a liquefied gas such as nitrogen for example.

Preferably, the process vessel means also has a first reduced cross-sectional area portion at an upper end thereof to enhance the mixing and hence cooling of the incoming sublimed gas with the cold coolant fluid by virtue of a reduced volume in which mixing may occur.

Preferably, the vessel also includes means for external heating thereof and means for conducting heat from the walls of said vessel into the interior thereof for heating the solidified $UF_6$ to promote more efficient liquefication. The heating means may be by induction heating and may include one or more induction heating coils wrapped around the vessel which may be made of a nickel alloy, for example. Heat conduction means may comprise bars which extend through the interior of the vessel and which are in contact with the walls thereof and with the solidified $UF_6$ contained therein.

The description which follows is based on the processing of $UF_6$. However, other chemicals may be substituted where appropriate.

The cold or liquefied inert fluid may, for example, comprise nitrogen, helium, argon, neon, krypton or oxygen or any other suitable liquefiable gas.

The process vessel means may further comprise a second reduced cross-sectional area portion at the lower end thereof, below the collecting tank portion, and into which the conduit extends. The other end of the conduit may extend to the upper portion of the vessel above the level at which the $UF_6$ finally settles. The conduit may be routed internally or externally of the process vessel. The solidified $UF_6$ is removed from the vessel by converting to the liquid under pressure. As in prior art processes, the vessel is sealed off and its temperature raised by external heating means. As the solid $UF_6$ starts to sublime, the pressure in the vessel gradually increases to above 2 Bar at which pressure the solid $UF_6$ melts to form a liquid at about 75° C. Once all the $UF_6$ is liquefied, the valve on the conduit reaching into the second or lower reduced cross-sectional area portion is opened and the pressure of the $UF_6$ gas in the vessel above the $UF_6$ liquid level forces the liquid out of the vessel into storage cylinders to await use or to a next process step in the case of $UF_6$ derived from reprocessed irradiated fuel. Thus, no mechanical pumps or any devices, other than relatively simple valves to open and shut conduits and to control flow, are employed in the apparatus of the present invention.

The conduit to the second reduced cross-sectional area portion may also act as an inlet for an inert gas if the solid within the vessel is to be heated and sublimed rather than liquefied.

The means for introducing liquefied inert gas into the vessel may be an appropriate conduit and spray nozzle.

The means for admitting $UF_6$ gas into the vessel may be an appropriately dimensioned conduit.

Where the $UF_6$ is of new manufacture, it may be admitted into the vessel in substantially pure form. Where the $UF_6$ gas results from reprocessing of irradiated fuel, it may be mixed with an inert carrier gas prior to admission to the vessel in order to control any exothermic reactions.

The first reduced cross-section portion at the upper portion of the main vessel is intended to cause intimate mixing and therefore, rapid cooling and solidification of the $UF_6$ gas. The liquefied inert gas is preferably admitted to the vessel in the form of a spray via a nozzle arrangement into the reduced area portion.

All conduits which enter and exit the vessel may be provided with valve means so that the vessel may be sealed off from the atmosphere and from any other associated plant or equipment.

The means for extracting the inert gas after the $UF_6$ has been cooled and solidified may be a further conduit in the wall of the vessel. Once the $UF_6$ has been cooled by the liquefied inert gas, it is converted to a "snow-like" solid material which settles into the collecting tank portion at the bottom of the process vessel. Initially, the temperature of the incoming liquid nitrogen for example is about 77° K and the incoming $UF_6$ is about 305° K. Once the $UF_6$ has de-sublimed, the temperature of the nitrogen is caused to be raised to about 135° K at which temperature the liquefied nitrogen is gasified but the solid $UF_6$ particles have a virtually zero vapour pressure and hence, the solid $UF_6$ particles settle out in the bottom of the vessel. However, the exit conduit for the gasified nitrogen is preferably supplied with a filter to trap small particles of $UF_6$ which are entrained and carried out of the conduit by the gas flow stream. Preferably, the filter is placed above a substantially vertical conduit section and is provided with external heating means such that any entrapped $UF_6$ is melted at the same time as the main bulk of solid $UF_6$ in the process vessel and drains naturally downwardly into the vessel. The filter may, for example, be a sintered nickel powder filter.

Due to the very low cost of liquid nitrogen or argon, once the gasified liquid gas has exited the vessel and passed through any appropriate filtration systems and scrubbers to remove any contamination from whatever cause, it may be vented to atmosphere with no need for any subsequent recycling or treatment as is necessary with prior art processes employing ethylene glycol thus, making the apparatus of the present invention significantly more economic and easier to operate.

A further very important advantage of the apparatus of the present invention is that there are no moving parts included, other than valves, and which removes any need for servicing or maintenance in this regard. This is particularly important where the $UF_6$ being treated is derived from irradiated fuel having a high level of radioactivity. Furthermore, the apparatus of the present invention in addition to having no moving parts requiring maintenance is also relatively very simple in the construction of the vessel since there are relatively very few welds as in the heat exchanger type of construction of the prior art apparatus. Thus, the vessel of the apparatus of the present invention has a greater integrity than prior art vessels and much less liable to fatigue cracking.

In order that the present invention may be more fully understood, an example will now be described by way of illustration only with reference to the accompanying drawings, of which:

Figures 1, 2:
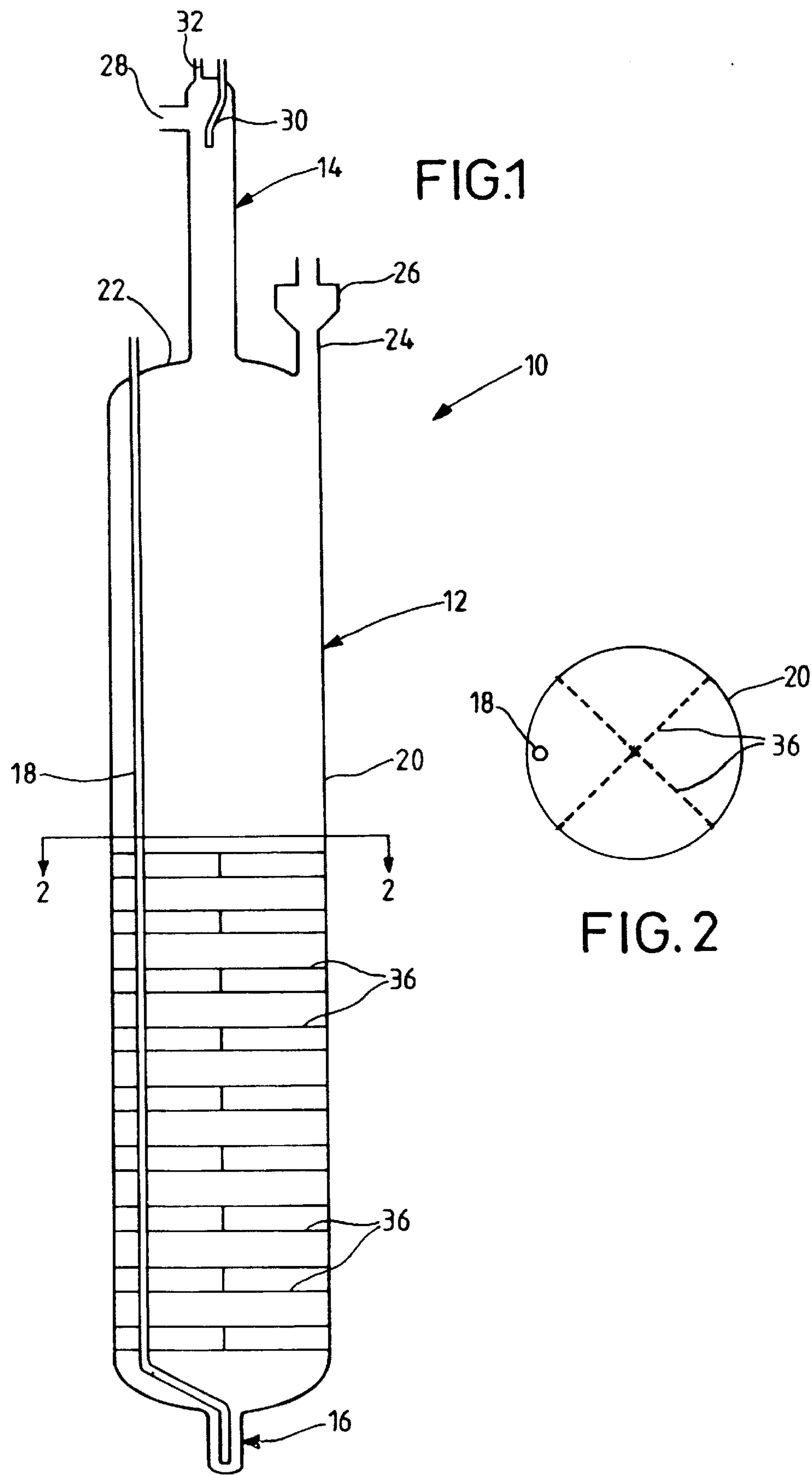
FIG. 1 shows a cross section in elevation through apparatus according to the present invention.
FIG. 2 shows a cross section on the line 2—2 of FIG. 1.
Figures 3, 4:
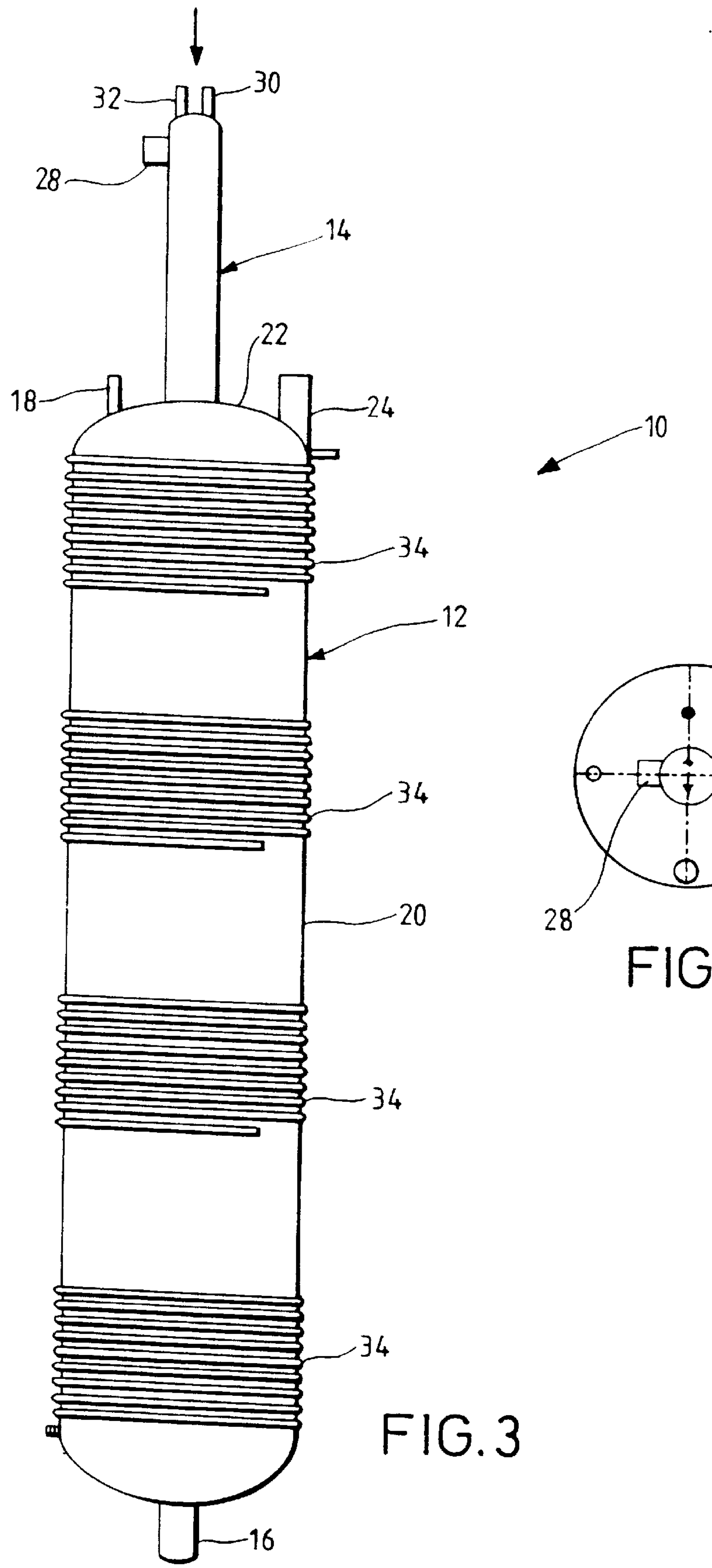
FIG. 3 shows an elevation view of the treatment vessel of FIG. 1.

FIG. 4 which shows a plan view of the vessel of FIG. 3 in the direction of the arrow in FIG. 3.

Referring now to the drawings and where the same features are denoted by common reference numerals.

The apparatus described below relates to an example of solidifying $UF_6$. However, other chemicals could be processed in a similar manner.

Apparatus according to the present invention is indicated generally at 10. The apparatus comprises a receiving and settling vessel 12 having a first reduced cross-sectional area portion 14 at the upper end thereof and a second reduced cross-sectional area portion 16 (also called a "boot") at the lower end thereof. A conduit 18 extends through the main part 20 of the vessel 12 from the boot 16 to exit out of the upper wall 22 of the vessel main portion 20. A vent 24 to allow escape of gasified liquid coolant is also provided in the upper wall 22. The vent 24 is also provided with a filter 26 to trap small particles of solidified $UF_6$ entrained in an escaping gas stream. The first reduced section portion 14 is provided with an entry conduit 28 to admit gaseous $UF_6$, either substantially pure or mixed with a diluent gas such as nitrogen or argon for example, to the vessel. Opposite to the entry conduit 28 is a further conduit 30 supplying liquefied gas such as liquid nitrogen or argon for example, to the vessel 12. A further conduit 32 is provided to the vessel to admit pressurising gas to the vessel as will be explained below. An induction heating coil 34 surrounds the outside of the vessel main portion 20 so as to enable the vessel to be externally heated. A plurality of baffle bars 36 arranged in cruciform relationship are provided within the lower portion of the main portion 20 to conduct heat from the induction heated walls of the vessel to the $UF_6$ which settles within the main portion and envelopes the baffle bars 36 and as will be explained in greater detail below.

All entry and exit conduits are provided with suitable valves (not shown) so that any supply or product flow may be stopped at will and the vessel 12 sealed off if desired.

In operation, $UF_6$ gas is admitted to the portion 14 through conduit 28 whereupon it is mixed with liquid gas admitted through conduit 30, the reduced volume portion 14 forcing the two incoming fluid streams to mix intimately. The incoming $UF_6$ stream is cooled by the liquid gas, which itself is gasified, the $UF_6$ becoming solidified and forming a "snow-like" solid which falls through the main portion 20 of the vessel 12 and settles in the bottom of the vessel to eventually build up in height and surround the baffle bars 36. The upper part of the main portion 20 is effectively a disentrainment portion allowing the $UF_6$ particles to separate from the gasified coolant which escapes through the exit conduit 24 and filter 26. The escaping gas also passes through other known cleaning plant (not shown) before being vented to atmosphere. Once the vessel is filled with the required volume of solid $UF_6$, the $UF_6$ supply conduit 28, liquid gas conduit 30 and escape vent 24 are closed off and the vessel 12 is heated by the induction coil 34. The filter 26 may also have its own heating means (not shown). The Solid $UF_6$ begins to sublime at about 75° C. causing the pressure in the sealed vessel 12 to rise and once the pressure has risen to about 2 Bar, the $UF_6$ turns to a liquid and drains to the bottom of the vessel 12 filling the boot 16. Heat is conducted to the solid settled $UF_6$ by the baffle bars 36 which conduct heat from the inductively heated vessel walls. Heating is continued until all the $UF_6$ has melted and drained to the bottom of the vessel 12. Alternatively, The vessel 12 may be pressurised by inert gas admitted through the conduit 32 so as to establish a pressure of about 2 Bar minimum within the vessel whereupon the $UF_6$ melts on heating rather than initially subliming. The now liquid $UF_6$ is forced out of the conduit 18 on opening of a valve (not shown) thereon, the liquid $UF_6$ being ejected by virtue of the gas pressure within the vessel and which may be assisted by further inert gas admitted through the conduit 32. The conduit 18 is connected either to storage means (not shown) or to process plant (not shown) depending upon the type of $UF_6$ being processed and as explained above.

I claim:

1. Apparatus for the solidification by desublimation of a sublimed gaseous substance and the subsequent trapping and liquefication of said desublimed substance, the apparatus comprising:

means for the supply of a coolant fluid to a process vessel means;

means for the supply of said sublimed substance to said vessel;

means for enabling the direct contact and mixing of said coolant fluid with said sublimed substance so as to reduce the temperature of said sublimed substance to below a dewpoint thereof;

said vessel means including a lower tank portion into which solid desublimed substance falls;

said vessel means further including heating means at least about said tank portion;

valve means to enable said vessel means to be sealed to allow a raised pressure to be established in said vessel means;

conduit means having a first end at a position adjacent a lower end of said tank portion such as to be immersed in liquid resulting from the liquefaction of said desublimed substance, and a second end remote from said first end outside said vessel and connected to means to receive said liquefied substance; and said conduit means having means to permit the controlled expulsion of said liquefied substance.

2. Apparatus according to claim 1 wherein said sublimed substance is $UF_6$.

3. Apparatus according to claim 1 wherein vessel also includes means for conducting heat from walls of said vessel into the interior thereof for heating solidified $UF_6$.

4. Apparatus according to claim 1 wherein the heating means is induction heating.

5. Apparatus according to claim 1 wherein said coolant fluid is a liquefied gas.

6. Apparatus according to claim 5 wherein the liquefied gas is selected from at least one of nitrogen; argon, helium, neon; krypton; oxygen; or, any other suitable liquefiable gas.

7. Apparatus according to claim 1 wherein the process vessel means has a first reduced cross-sectional area portion at an upper end thereof to enhance mixing of said sublimed gas and said coolant fluid.

8. Apparatus according to claim 1 wherein said process vessel means further comprises a second reduced cross-sectional area portion at the lower end thereof and into which second portion a conduit extends.

9. Apparatus according to claim 5 wherein the conduit extends upwardly out of said vessel to provide an exhaust conduit for liquid desublimed gas.

10. Apparatus according to claim 1 wherein the vessel is provided with a further conduit to supply an inert gas under pressure thereto.

11. Apparatus according to claim 1 wherein said process vessel is a unitary vessel into which said sublimed substance is introduced, subsequently desublimed and liquefied.

12. Apparatus according to claim 1 wherein said process vessel is a generally cylindrical vessel having an axis maintained generally vertically.

13. A method for the solidification by desublimation of a sublimed gaseous substance and the subsequent trapping and liquefaction of said desublimed substance, the method comprising the steps of:

cooling a sublimed substance by direct mixing with a coolant fluid within process vessel means to a temperature below a dewpoint of said sublimed substance to cause desublimation of said sublimed substance into a solid;

allowing said solid to settle and be collected in a collecting tank portion of said process vessel means;

heating said desublimed substance in said vessel means and causing a pressure rise within said vessel, the combined effect of said heating and said pressure rise being to cause liquefaction of said desublimed substance in said process vessel means.

14. A method according to claim 8 wherein said sublimed gas is $UF_6$.

15. A method according to claim 8 wherein said coolant fluid is a liquefied gas.

16. A method according to claim 8 wherein said pressure rise is used to expel liquefied desublimed substance from said process vessel.

17. A method according to claim 8 wherein a pressure rise due to an applied inert gas is used to expel liquefied desublimed substance from said process vessel.

18. A method according to claim 13 wherein said direct mixing is effected by mixing an incoming stream of said gaseous substance in said vessel means with a stream of coolant fluid supplied by a separate source, the mixing first occurring in said vessel means.

19. A method according to claim 13 wherein said sublimed gaseous substance and said coolant fluid are introduced separately into a reduced volume portion (14) of said vessel, said reduced volume portion promoting mixing thereof.

20. A method according to claim 13 wherein said vessel means is provided in the form of a generally cylindrical vessel having an axis maintained in the vertical direction.

* * * * *